Oct. 6, 1959

C. F. MILLER ET AL 2,907,911

ELECTRON DISCHARGE DEVICE

Filed Jan. 16, 1956

WITNESSES

INVENTORS
Carl F. Miller, William H. McCurdy
& Ernest A. Lederer
BY
ATTORNEY

Oct. 6, 1959     C. F. MILLER ET AL     2,907,911
ELECTRON DISCHARGE DEVICE

Filed Jan. 16, 1956     5 Sheets-Sheet 2

Oct. 6, 1959

C. F. MILLER ET AL 2,907,911

ELECTRON DISCHARGE DEVICE

Filed Jan. 16, 1956

United States Patent Office 2,907,911
Patented Oct. 6, 1959

2,907,911

ELECTRON DISCHARGE DEVICE

Carl F. Miller, Bath, and William H. McCurdy, Horseheads, N.Y., and Ernest A. Lederer, Essex Fells, N.J., assignors to Westinghouse Electric Corporation, East Pittsburgh, Pa., a corporation of Pennsylvania Application January 16, 1956, Serial No. 559,342

8 Claims. (Cl. 313—252)

This invention relates to electron discharge devices and, more particularly, to electron discharge devices that have structures particularly adapted for use with printed circuitry.

In current printed circuit techniques, the inclusion of electron tube sockets in the printed circuits involves considerable alignment difficulty and additional time and expense. For example, 9-pin electron tube sockets must be carefully aligned with 9 radial strips on the printed circuit board and 9 soldered connections to the socket lugs must be made. Frequently, one or more of these connections later proves to be weak or faulty and an open circuit results.

Also, when sockets are used, the electron tube axis is perpendicular to the plane of the printed circuit board which causes the electron tube to project a considerable distance above the circuit board and results in poor space utilization. The electron tube acts as a cantilever which results in considerable vibration, thereby limiting the vibrational forces to which the tube may be submitted, especially when used in military equipment.

In addition, the tube socket introduces extra capacitances, inductances and couplings which result in hum, other pickup difficulties and circuit losses.

In general, our invention involves an electron discharge device which does not require a socket and which is readily adaptable to automatic assembly.

Accordingly, it is an object of our invention to provide an improved electron discharge device which does not require a socket.

It is another object to provide an improved electron discharge device which provides better space utilization in printed circuitry.

It is a further object to provide an improved electron discharge device utilizing a resinous or low-melting-point glass solder seal.

It is an additional object to provide an improved electron discharge device in which the lead members leave the device through a seal portion of the device.

It is a different object to provide an improved method of making a resinous or low-melting-point glass solder seal.

It is still another object to provide an improved gettering method for an electron discharge device in which a resinous or low-melting-point glass solder seal is utilized.

These and other objects of our invention will be apparent from the following description taken in accordance with the accompanying drawing throughout which like reference characters indicate like parts, which drawing forms a part of this application, and in which.

Figure 1:
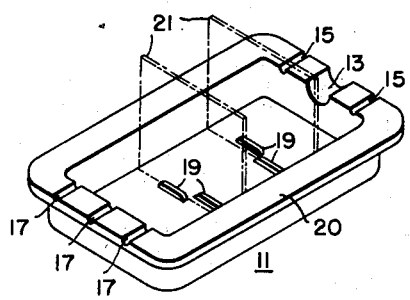
Figure 1 is a perspective view of an envelope portion according to one embodiment of our invention.

In our invention the envelope member of an electron discharge device may be comprised of envelope portions 11 which may be recessed and flanged as shown in Fig. 1. The envelope portions 11, which may be made of glass, if desired, include a number of grooves which allow various parts of the electron discharge device to be connected from outside the envelope. For example, there is shown an exhaust tubulation groove 13, heater lead grooves 15 and electrode lead grooves 17. The dotted lines indicate where spacer members 21, preferably made of a substance such as mica, may be inserted in the envelope portion 11. As can be seen, the spacer members 21 may be readily fixed in position by spacer holder members 19. If desired the envelope portion may be equipped with grooves suitable for positioning the spacer members 21, although the spacer holder members 19 may prove more desirable if grooves less than 0.005 in. wide are difficult to make. Also, the spacer member 21 may be positioned by a slight surplus of the material used to seal the envelope portions together in the sealing operation to be described later. The flange portions 20 of the envelope portion 11 are also shown.

The particular envelope portion 11 pictured in Fig. 1 is suitable for use in a triode and is rectangular in general outline. As will be shown later, numerous variations of the design of the envelope portion 11 may be made and envelope portions adapted for use with pentode electrode structures, twin triode electrode structures, etc., are also feasible.

Figure 2:
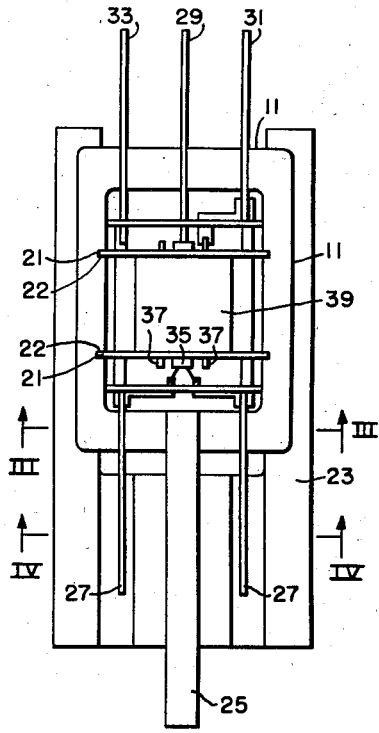
Fig. 2 is a top view of a partially assembled electron discharge device according to one embodiment of our invention.
Figure 3:
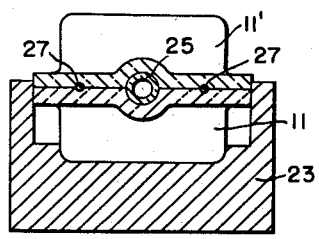
Fig. 3 is a sectional view along the line III—III for the device shown in Fig. 2 with the addition of a top envelope portion.
Figure 4:
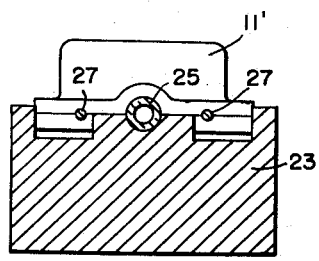
Fig. 4 is another sectional view along line IV—IV of the device shown in Fig. 2 with the addition of a top envelope portion.

An electron discharge device may be constructed according to our invention as shown in Figs. 2 through 4. A completed electrode structure which may be of the conventional type is assembled in a suitable manner and is placed in an envelope portion 11 which has been previously positioned in an envelope support member 23. The electrode structure may include a cathode electrode 35, an anode electrode 39, and a grid electrode (not shown). Grid electrode support members 37 are shown. Cathode heater lead members 27 as shown in this particular embodiment leave the envelope through one end of the envelope member and electrode leads including a cathode lead member 29, a control grid electrode member 31 and an anode lead member 33 leave through the other end of the envelope member. This particular lead arrangement has the advantage of reducing the internal input capacitance of the tube, since the coupling of the heater lead members 27 to the control grid electrode lead member 31 is practically eliminated. Also, the hum pickup by the control grid electrode lead member 31 from the heater lead members 27 is also markedly reduced. This structure further results in having the terminals of the active circuit located at one end of the envelope, thus making them easily recognizable and simple to insert and solder to the proper connections. Also, the heater lead members 27 of several electron discharge devices may be oriented to a common heater bus on a printed circuit board which further reduces hum pickup and in general simplifies the layout of the circuit. As shown, the spacer members 21 may be inserted in spacer member grooves 22 in the envelope portion 11. An exhaust tubulation 25 is placed in the exhaust tubulation groove 13.

In Figs. 3 and 4 there are shown sectional views of Fig. 2 along lines III—III and IV—IV, respectively, after the addition of an envelope portion 11'. This envelope portion 11', which may be identical with the above-described envelope portion, is then sealed to the envelope portion 11. In one embodiment of our invention the sealing material is glass solder material having a working point substantially below the softening point of the material of the envelope. After the solder is applied, the electron discharge device is inserted in an oven and heated to a temperature of 450–550° C. for 8–10 minutes. As soon as the solder softens, the exhaust tubulation 25 is connected to an exhaust pump and exhausted for 3 minutes until a desirable vacuum is established which, due to external atmospheric pressure, causes the two envelope portions 11, 11' to press tightly against the soft solder resulting in a hermetic seal. The temperature is then reduced and the electron discharge device may be removed from the envelope support member 23. The exhaust process is continued for 10 minutes while the metal parts are being degassed and the cathode is being activated and finally the exhaust tubulation 25 is tipped off. If desired during the initial heating step an inert gas such as argon may be injected through the tubulation 25 to avoid oxidation of the metal parts of the electrode structure. It is important that the solder-glass used have a working temperature that is below the strain point of the glass used in the envelope portion 11 in order to avoid introducing strains into the envelope. Also, the coefficient of thermal expansion of the solder-glass must closely match the coefficients of various lead members and the envelope itself. For example, we have found that a soda lime glass having a strain point of 478° C., a coefficient of thermal expansion of $92 \times 10^{-7}$ per °C., a working point of 1000° C. and a softening point of 696° C., is suitable for use as an envelope material with a solder glass seal material which has a softening point of 440° C. and a coefficient of thermal expansion of $84 \times 10^{-7}$ per °C. We have found that a material known as dumet (a copper plated alloy of 42% nickel and 58% iron) is suitable for use in the various lead members with the above materials. Another alloy suitable for use in lead members is composed of 42% nickel, 6% chromium and 52% iron.

Another suitable combination involves the use of envelope material of a glass having a strain point of 459° C. and a coefficient of thermal expansion of $101 \times 10^{-7}$ per °C. A suitable solder glass seal material may have a coefficient of thermal expansion of $101 \times 10^{-7}$ per °C. and a softening point of 425° C. With these materials, suitable lead members have been made of chrome-iron alloys or of dumet. Other envelope materials may be used, such as hard glass or ceramic materials with suitable sealing materials.

We have also found that suitable sealing materials may include those known as epoxy resins. These epoxy resins are glycidyl polyethers and may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkaline is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the average number of 1,2-epoxy groups

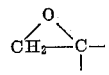

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

The epoxy resins may be applied to the flange portions 20 of the envelope portion 11 in the form of powder or paste. The material softens upon heating and the seal is formed in a manner similar to the solder glass seal described above. Silicone resins have also been found to be suitable sealing materials. These resin materials have polymerization points substantially below the softening point of the envelope material.

Figure 5:
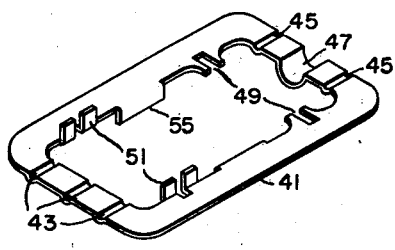
Fig. 5 is a perspective view of a metal flange member which may be inserted in the seal portion of an electron discharge device according to one embodiment of our invention.

However, as these epoxy resins and silicone resins may not be heated as high as might be desirable during the degassing process, we have sometimes found it desirable to insert a metal flange member 41 similar to that shown in Fig. 5 between the two envelope portions 11 before they are sealed together. This flange member 41 should be made of a material having a high heat conductivity, for example, aluminum, copper, silver or molybdenum. The flange member 41 is covered on both sides with the resin where in will come in contact with the flange portions 20 of the envelope portions 11. The seal is made by applying heat and pressure in a manner similar to that described above. During the degassing process, the metal flange member 41 is cooled in such a manner as to keep the temperature of the resin seal considerably below that reached by parts of the envelope portions 11. This cooling may be done by attaching suitable water or air-cooled fixtures to the metal flange member 41. The flange member 41, therefore, conducts the heat away from the resinous seal and also forms a narrow region of the portion 11 adjacent to the seal. It is possible that some of the glass surface of the envelope portion 11 located adjacent to the seal may not be adequately degassed because of this cooling, but since this surface is only a very small fraction of the inner surface of the portions 11, it does not effect the quality of the tube perceptively. Also, gettering means as described below may be used to remove the remaining gases.

As shown in Fig. 5, the metal flange member 41 may include electrode lead grooves 43, heater lead grooves 45 and an exahust tubulation groove 47. Various spacer support members may be utilized, such as a notch type spacer support member 49 and a cleat type spacer support member 51. Also shown is the metal flange support member 55. If desired, small interior projections may be made on the metal flange member 41 which may be utilized in various ways, such as supporting getters. It may be desirable to use "prebeaded" lead members to avoid direct contact between the metal flange member 41 and the lead members. Prebeaded lead members are made by enclosing a portion of an ordinary lead wire in a glass sleeve and may be made on an automatic machine. Also, it may be desirable to use the metal flange member 41 with solder seals or seals of other materials.

It is also possible to use this metal flange type cooling device in a cathode ray tube when the face plate is sealed to the remainder of the envelope. In that case, internal projections may be used as a second anode contact.

We have found that occasionally a slight heating of a lead member sealed in an epoxy resin results in an air leak through the seal. To remedy this condition, it may sometimes be advisable to use prebeaded wires for lead members.

If the use of a metal flange member 41 is not desirable, the resinous seal may be cooled by other means, such as air blasts, or by placing the seal portion in contact with a cooled heat conductor or by a combination of the above means.

It is sometimes found to be desirable, particularly if the envelope is of a comparatively low melting point material, not to heat the envelope portion 11 above a temperature which is suitable for the seal material. As a result of heating at this comparatively low temperature, the moisture film on the interior of the glass portion 11 and other occluded gases are only partially removed. This results in a certain amount of gas evolution during the life of the tube, which gas might not be adequately removed by the ordinary getter. We have found that this moisture film may be removed from the glass by bombardment by charged particles, such as electrons or ions, or through moderate heat. Both these processes are accelerated under reduced pressure conditions. In order to utilize this effect, the inside surface of the envelope portion may be coated with a suitable metallic layer. Preferably, this layer should exhibit an affinity to water vapor so that the moisture may be removed by chemical combination. As a result, a metal oxide and hydrogen are produced. We have also found it to be desirable to coat the portions of the seal so that no decomposition of the seal material occurs due to particle bombardment. This protective metal film may be evaporated at a lower temperature than the maximum envelope temperature reached during the degassing process. Suitable materials which react readily with water but not with the resinous seal material and have a desirably low vapor pressure includes magnesium, calcium, lithium, zirconium, hafnium, titanium, aluminium, zinc, manganese and vanadium. This protective metallic film may be electrically connected to the cathode or to another grounded electrode.

The hydrogen evolved in the previous step may be removed by a hydrogen-removing getter material which is evaporated in the envelope after it has been sealed and tipped off. Suitable hydrogen getter materials include beryllium, thorium, cerium, lanthanum, tantalum, columbium, zirconium and titanium. Of course, the protective metallic film and the hydrogen-removing getters are not limited to the above materials.

Figure 6:
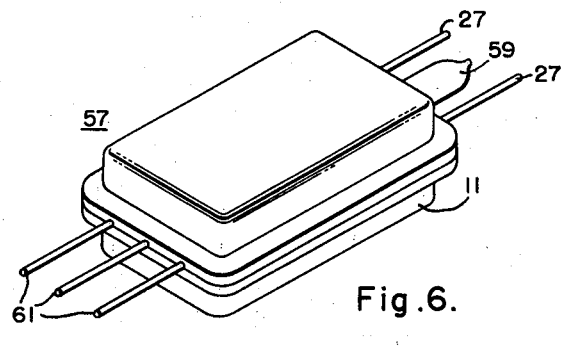
Fig. 6 is a perspective view of a triode having a rectangular-shaped envelope constructed according to one embodiment of our invention.

In Fig. 6 there is shown a perspective view of a completed triode device 57 using a rectangular-shaped envelope according to one embodiment of our invention. Also shown are a tipped off exhaust tubulation 59 and heater lead members 27 leaving the envelope at one end, and the electrode lead members 61 leaving the envelope at the other end. As can be seen, the envelope portions 11 utilized in this particular embodiment are identical. However, if desired, non-identical envelope portions may be used in this embodiment or in other embodiments.

Figure 7:
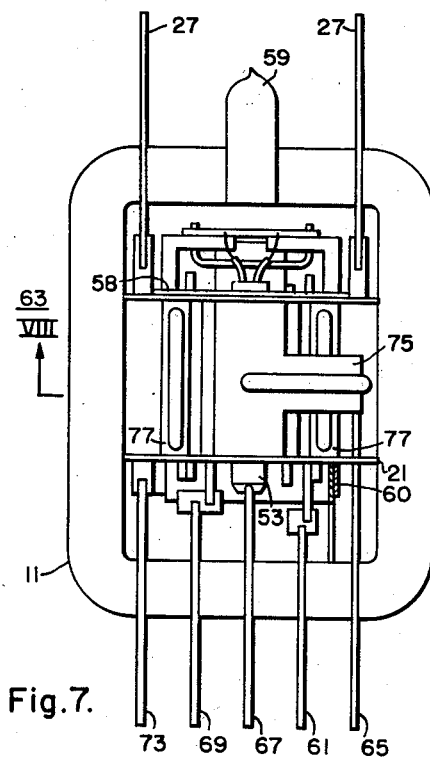
Fig. 7 is a top view of a partially assembled pentode having an envelope similar in shape to that shown in Fig. 6.
Figure 8:
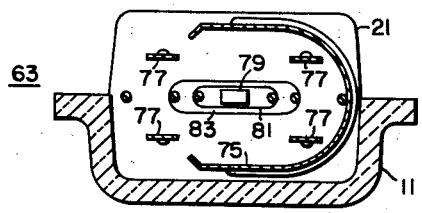
Fig. 8 is a sectional view along the lines VIII—VIII of the partially assembled pentode shown in Fig. 7.

In Figs. 7 and 8 there is shown a partially-assembled pentode device 63 in which a rectangular-shaped envelope is utilized. In Fig. 7 one envelope portion has not been attached and the remaining envelope portion 11 is shown including a tipped off exhaust tubulation 59. Heater lead members 27 are shown projecting from one end of the envelope while an anode lead member 65, a cathode lead member 67, a control grid electrode lead member 69, a screen grid electrode lead member 61 and a suppressor grid electrode lead member 73 are shown projecting from the other end. We have found this particular lead member arrangement to be advantageous but, if desired, the various lead members in this or other embodiments may leave the envelope through other patrs of the seal. Also shown are an anode electrode 75, a cathode electrode 53, a suppressor grid electrode 77, and electrostatic shield members 58 and 60. The shield members 58 and 60 which may be made of sheet metal, reduce the coupling between the anode electrode 75 and the control grid electrode to a minimum. These shield members 58 and 60 are necessary if the pentode is used in an I.F. or R.F. amplifier.

A sectional view taken along the lines VIII—VIII in Fig. 7 is shown in Fig. 8 including the envelope portion 11 and spacer member 21. Also shown are a cathode electrode 79, a control grid electrode 81, a screen grid electrode 83, a suppressor grid electrode 77, and an anode electrode 75.

Figure 9:
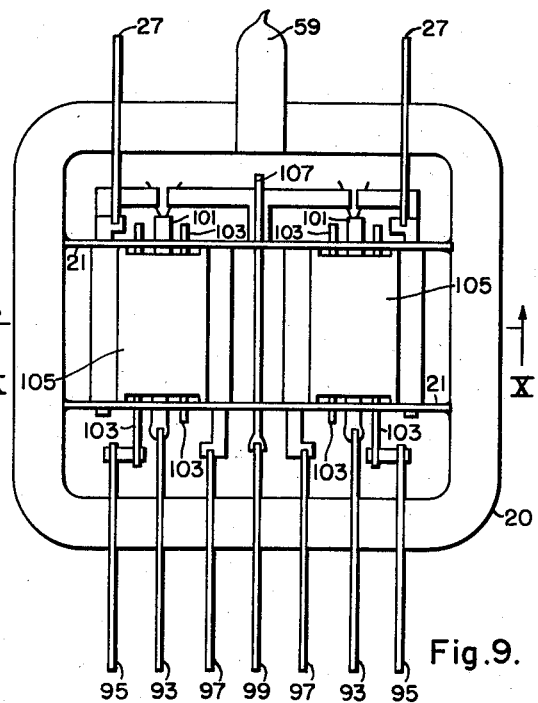
Fig. 9 is a top view of a partially assembled twin triode in a square-shaped envelope.
Figure 10:
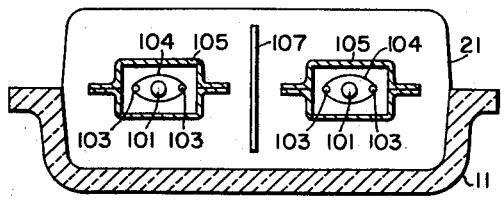
Fig. 10 is a sectional view along the lines X—X of the partially assembled twin triode shown in Fig. 9.

Another embodiment of our invention is shown in Figs. 9 and 10 in which a partially-assembled twin triode device utilizes a square-shaped envelope. A tipped off exhaust tubulation 59 and the heater lead members 27 again project from one end of the envelope and the remaining lead members project from the other end of the envelope, The electrode structure has been placed in an envelope portion 11 having a tipped off exhaust tubulation 59. Cathode electrode 101 and anode electrode 105 are shown as well as control grid support members 103. An electrostatic shield member 107 separates the two triodes. Heater lead members 27 project from one end of the envelope while cathode lead members 93, control grid lead members 95, anode lead members 97 and an electrostatic shield lead member 99 project from the other end. The sectional view taken along the line X—X of Fig. 9 as shown in Fig. 10 includes an envelope portion 11, a spacer member 21, the electrostatic shield member 107, the anode electrode 105, the cathode electrode 101, the control grid electrode 104 and control grid electrode support members 103.

Figure 11:
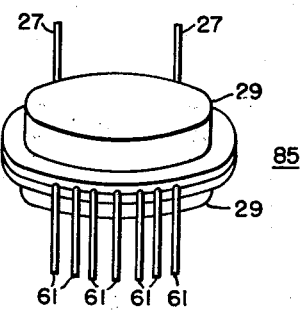
Fig. 11 is a perspective view of a twin triode having a circular-shaped envelope constructed according to one embodiment of our invention.
Figure 12:
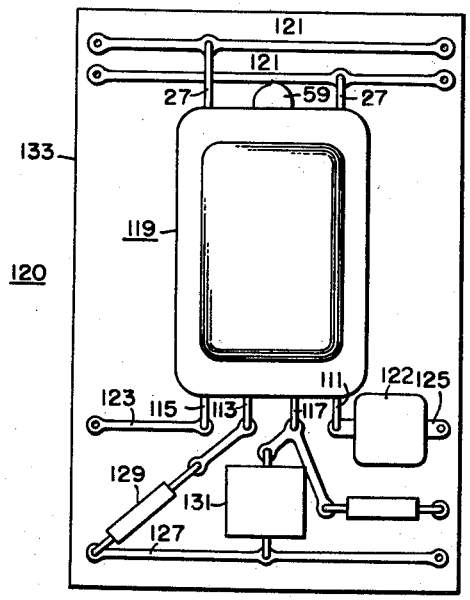
Fig. 12 is a top view of an embodiment of our invention as adapted to printed circuitry.

Another embodiment of our invention, namely, a twin triode device 85 in the circular-shaped envelope, is shown in Fig. 11. Also shown are heater lead members 27, envelope portions 29 and the remaining lead members 61. A suitable electrode structure for this type of device has been previously shown in Figs. 9 and 10.

As an example of specific sizes we have made, the dimensions of the triode envelope shown in Figs. 1–4 and 6 may be: length, 1.5 in.; width, 15/16 in.; height, 0.62 in.; lead wire diameter, 0.022 in.; and spacing between centers of electrode leads, 0.28 in. The dimensions of the pentode shown in Figs. 7 and 8 may be: length, 1 5/16 in.; width, 15/16 in.; height, 0.54 in.; length, including exhaust tip, 1 9/16 in.; lead wire diameter, 0.022 in.; and spacing between centers of electrode leads, 0.140 in. The dimensions of the circular twin triode shown in Fig. 11 may be: diameter of envelope, 1.25 in.; diameter plus exhaust tip, 1 5/8 in.; height, 0.50 in.; lead wire diameter, 0.022 in.; and spacing between centers of electrode leads, 0.105 in. The dimensions of the square twin triode shown in Figs. 9 and 10 may be: width, 1.25 in.; length, 1 1/8 in.; length, including exhaust tip, 1.5 in.; height, 0.50 in.; lead wire diameter, 0.022 in.; and spacing between centers of electrode leads, 0.125 in. Of course, these dimensions are merely examples, may be changed to fit circumstances and do not limit our invention.

As has been previously pointed out, one advantage of using envelope portions shaped as those in Figs. 1–11 is that they leand themselves to automatic production and assembly. For example, a conventional electrode structure may be placed in a lower envelope portion. The assembly may be completed by placing an upper envelope portion over the electrode structure and sealing to the lower envelope portion as described previously.

If desired, the lower envelope portion may serve as a receptacle into which an assembly machine places the component parts of the electrode structure in a desired sequence. Such an electrode assembly is described in a copending patent application by E. A. Lederer, entitled "Automatic Assembly of Radio Tube Mounts," Serial No. 375,524, filed August 20, 1953 and assigned to the same assignee as the subject application.

Figure 16:
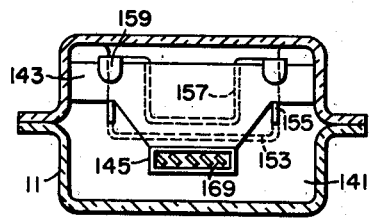
Fig. 16 is an end view of an electron discharge device constructed in accordance with one embodiment of our veniton in which one end of the envelope has been cut away.
Figure 17:
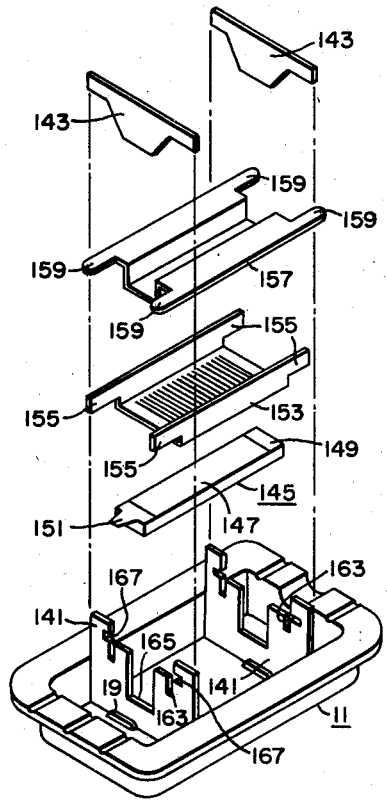
Fig. 17 is an expanded perspective view of portions of an electron discharge device constructed in accordance with our invention.
Figure 18:
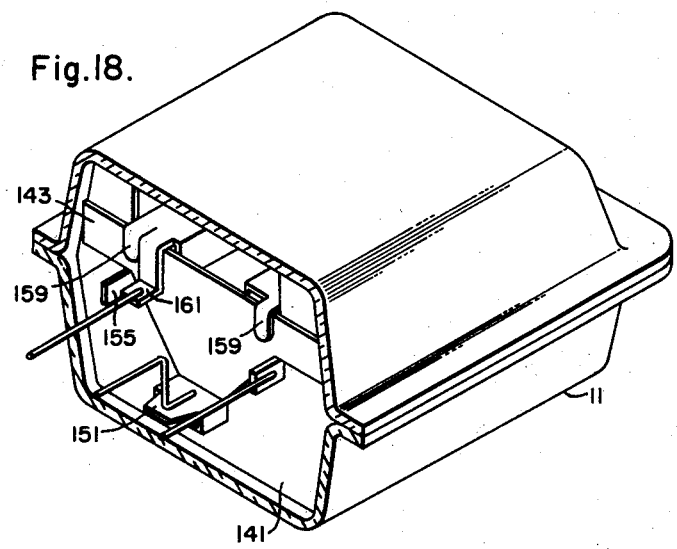
Fig. 18 is a perspective view of an electron discharge device constructed in accordance with one embodiment of our invention having one end of the envelope broken away.

Electron discharge devices usually have electrode elements held in the apertures of the spacer members. Therefore, the electrode elements are frequently slightly loose after assembly which gives rise to noise and microphonics during operation. Also, when the electrode elements are threaded into the apertures of the spacer members, additional distortion may result. In Figs. 16 through 18, there is shown an embodiment of our invention which is suitable for automatic assembly of electrode elements. An envelope portion 11 of the type described above has bottom spacer members 141 positioned as desired by grooves or spacer holder members. These bottom spacer members 141 are provided with spacer member cathode slots 165, spacer member grid tab slots 163 and spacer member anode tab slots 167. During the automatic assembly process, a cathode electrode 145 having a coated portion 147, an uncoated portion 149 and a cathode tab member 151 is positioned in the spacer member cathode slot 165. Next, a grid electrode 153 having grid tab members 155 is positioned so that the grid tab members are located in the spacer member grid tab slots 163. Next, top spacer members 143 are positioned as shown so that they rest on the grid tab members 155 and the cathode electrode 145 and are located adjacent to the bottom spacer members 141. Then the anode electrode 157 which includes anode tab members 159 is placed on top of the bottom spacer member. The anode electrode 157 is constructed so that it may be compressed sideways and upon expansion will lock itself in the spacer member anode tab slots 167. The anode tab members 159 are then bent downward to hold the top spacer member 143 in a locked position, thereby preventing the cathode electrode 145 and the grid electrode 153 from vibrating. Lead wires, not shown in Fig. 16 or 17, have been previously attached to the tabs of the electrode elements and passed through the envelope seal portion as described previously. If desired, an anode lead tab member 161 may be utilized as shown in Fig. 18. The bottom spacer member 141 and the top spacer member 143 may be made of mica or a ceramic material. The cathode heater 169 is also shown. It can readily be seen that all the elements are rigidly fixed in position thereby avoiding noise and microphonics and the structure is also readily adaptable to automatic assembly. A triode has been described in Figs. 16 through 18 but the same principle shown may be adaptable to other tubes and our invention is not limited to the particular structures shown.

An adaptation of an electron discharge device made according to our invention is shown in Figs. 12 through 15 in which an electron discharge device, in this case a pentode device 119 in a rectangular-shaped envelope, is mounted upon printed circuit boards. As can be seen in the module 120 shown in Fig. 12, the heater lead members 27 are connected to heater bus members 121. An input connection 123 is connected to a control grid lead member 115 while an output connector 125 is connected to an anode lead member 111 through a transformer 122. In this particular embodiment, the suppressor grid electrode has been internally connected to the cathode and the joint cathode-suppressor grid lead member 113 may be directly grounded or connected to a ground bus member 127 through a cathode-dropping resistor 129. The screen grid electrode lead member may be bypassed to the ground bus member 127 through a capacitor 131. Also shown is the tipped off exhaust tubulation 59.

Figure 13:
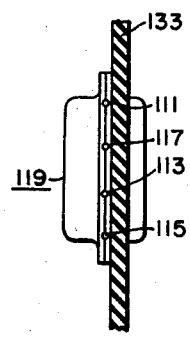
Fig. 13 is an end view of an electron discharge device constructed according to one embodiment of our invention in which the electron discharge device is placed in an opening in a printed circuit board.
Figure 14:
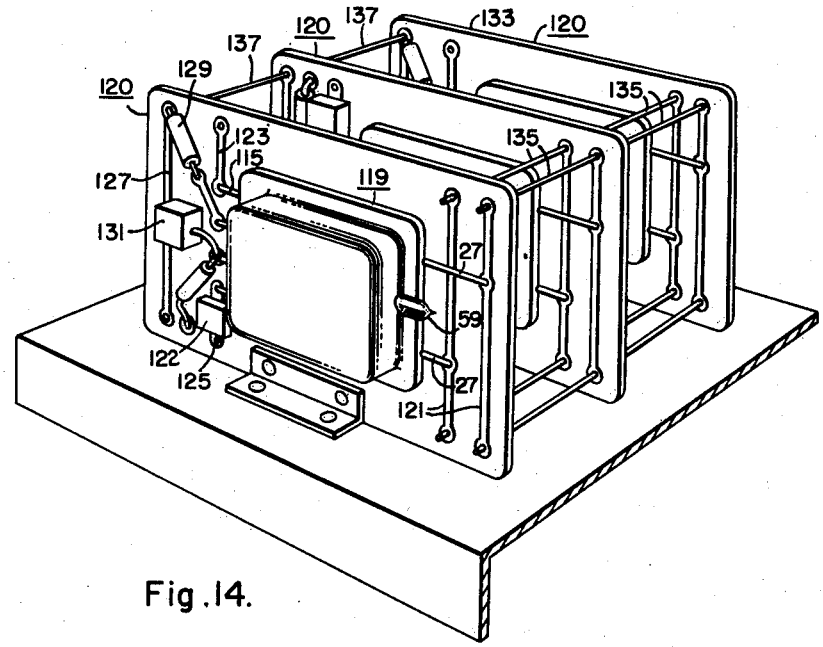
Fig. 14 is a perspective view of an embodiment of our invention as adapted to printed circuitry.
Figure 15:
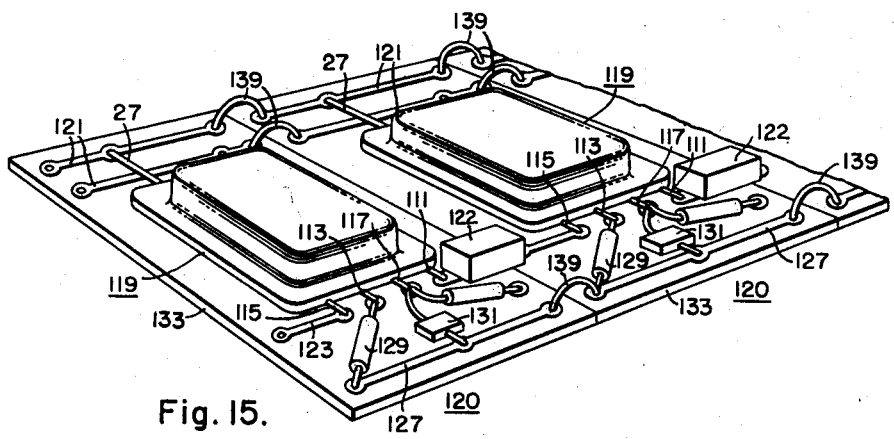
Fig. 15 is a perspective view of another embodiment of our invention as adapted to printed circuitry.

In Fig. 13 there is shown the pentode device 119 which is inserted in an opening in a printed circuit board member 133. This particular embodiment has the advantage of giving shorter leads to the circuit elements, improves the rigidity of the connections to the circuit elements and provides for an improved utilization of space. The module 120 shown in Fig. 12 or the embodiment shown in Fig. 13 may be utilized in a number of ways, such as shown in Figs. 14 and 15. In Fig. 14 the modules 120 are stacked and main heater lead members 135 and ground lead members 137 are utilized. In Fig. 15 the modules 120 are placed side-by-side and connecter members 139 connect the heater bus members 121 to each other and the ground bus members 127 to each other. These modules 120 provide a very flexible system which is both space saving and rigid. Loose wiring and cross-over wiring between printed circuit boards is eliminated.

The envelope portions, such as shown in Figs. 1, 6, and 11 have the advantage that they may be mass produced in large quantities by a pressing process. Thus, the mechanical accuracy of the dimensions of the envelope portion is higher than that obtained by the ordinary blown glassware as utilized in present electron discharge devices. Also because these envelope portions may be produced by a pressing process, the envelope design may include a number of variations, such as recesses for retaining spacer members, thus adding to the ruggedness and reliability of the tube. In general, because of their rectangular crosssection, as shown in Figs. 3, 8, 10, and 13, the tube may be mounted close to the printed circuit, thus providing an improved utilization of the space available.

The sealing process described in this application may be accomplished very cheaply in a conveyor belt furnace containing an inert atmosphere, such as argon, in order to prevent oxidation of the tube parts. We have also found that although the exhaust tubulation is usually made of glass, a metallic exhaust tubulation can be easily utilized in our invention.

The shielding of tubes laying on printed circuit boards, such as shown in Figs. 12 through 15, may be easily done and requires in most cases only a strap of sheet metal. In cases where poor air circulation exists, the heat from the envelope may be absorbed by a close fitting heat shield which may be provided with cooling means, such as fins, or which may be strapped to the chassis. As can readily be seen, the lead structures in tubes in the electron discharge devices of our invention are considerably simpler and are cheaper than the leads utilized in the ordinary socket tube because they need not be as heavy.

While the present invention has been shown in several forms, it will be obvious to those skilled in the art that it is not so limited but is susceptible of various changes and modifications without departing from the spirit and scope thereof.

We claim as our invention:

1. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said edge portion having a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members being positioned in said grooves and passing through said seal portion.

2. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members being positioned in said grooves and passing through said seal portion, said electron discharge device including a plurality of insulative spacer members within said envelope member, the interior surface of said envelope member including a plurality of spacer member positioning means which position said spacer members so that said spacer members rigidly support said electrode structure within said envelope member.

3. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said edge portion having a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of non-electrode-supporting lead members extending from inside said envelope member to outside said envelope member, said lead members being positioned in said grooves and passing through said seal portion, said electron discharge device including a plurality of insulative spacer members within said envelope member, the interior surface of said envelope member including a plurality of spacer member positioning means which position said spacer members so that said spacer members rigidly support said electrode structure within and relative to said envelope member, so that said lead members provide electrically conductive conduits only.

4. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said edge portion having a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members being positioned in said grooves and passing through said seal portion, said electron discharge device including a plurality of insulative spacer members within said envelope member, the interior surface of said envelope member including a plurality of spacer member positioning means which position said spacer members so that said spacer members rigidly support said electrode structure within said envelope member, said spacer member positioning means including a plurality of spacer member grooves.

5. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said edge portion having a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members being positioned in said grooves and passing through said seal portion, said electron discharge device including a plurality of insulative spacer members within said envelope member, the interior surface of said envelope member including a plurality of spacer member positioning means which position said spacer members so that said spacer members rigidly support said electrode structure within said envelope member, said spacer member positioning means including a plurality of protruding spacer holder members.

6. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said edge portion having a plurality of lead grooves extending from the interior of said envelope member to the exterior of said envelope member, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members being positioned in said grooves and passing through said seal portion, said lead members including heater lead members, said heater lead members passing through a first part of said seal portion with the remaining lead members passing through a second part of said seal portion.

7. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said first envelope portion and said second envelope portion being hermetically sealed together at said edge portion by a seal portion of an insulative second material having a melting point substantially below the melting point of said first material, said electron discharge device having a plurality of lead members extending from inside said envelope member to outside said envelope member, said lead members passing through said seal portion, said electron discharge device including a plurality of insulative spacer members within said envelope member, the interior surface of said envelope member including a plurality of spacer member positioning means which position said spacer members so that said spacer members rigidly support said electrode structure within said envelope member.

8. An electron discharge device comprising an envelope member having a first envelope portion and a second envelope portion, said first envelope portion and said second envelope portion being made of a first material, said first envelope portion having a recess portion and a peripheral edge portion adjacent to and surrounding said recess portion, said first envelope portion and said second envelope portion being hermetically sealed together at said edge portion by a seal portion of an insulative second material having a melting point substantially below the melting point of said first material, said electron discharge device having a plurality of non-electrode-supporting lead members extending from inside said envelope member to outside said envelope member, said lead members passing through said seal portion, said electron discharge device including a plurality of insulative spacer members within said envelope member, the interior surface of said envelope member including a plurality of spacer member positioning means which position said spacer members so that said spacer members rigidly support said electrode structure within and relative to said envelope member, so that lead members provide electrically conductive conduits only.

References Cited in the file of this patent
UNITED STATES PATENTS

| | | |
|---|---|---|
| 2,030,187 | Salzberg | Feb. 11, 1936 |
| 2,156,048 | Baier | Apr. 25, 1939 |
| 2,164,910 | Gaebel | July 4, 1939 |
| 2,226,653 | Allerding | Dec. 31, 1940 |
| 2,629,093 | Pask et al. | Feb. 17, 1953 |
| 2,644,100 | Braunsdorff | June 30, 1953 |
| 2,731,578 | McCullough | Jan. 17, 1956 |
| 2,740,067 | Sarg | Mar. 27, 1956 |

FOREIGN PATENTS

| | | |
|---|---|---|
| 881,954 | France | Feb. 8, 1943 |